United States Patent
Dudar (10) Patent No.: US 10,619,603 B2
(45) Date of Patent: Apr. 14, 2020

(54) METHODS AND SYSTEMS FOR DIAGNOSING ENGINE INTERNAL EXHAUST GAS RECIRCULATION

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 15/682,820

(22) Filed: Aug. 22, 2017

(65) Prior Publication Data
US 2019/0063377 A1   Feb. 28, 2019

(51) Int. Cl.
| F02M 26/49 | (2016.01) |
| F02D 41/22 | (2006.01) |
| F02D 41/02 | (2006.01) |
| F02M 26/01 | (2016.01) |
| F02M 26/47 | (2016.02) |
| F02D 41/00 | (2006.01) |
| B60W 20/50 | (2016.01) |
| F02D 41/04 | (2006.01) |

(52) U.S. Cl.
CPC ............ *F02M 26/49* (2016.02); *B60W 20/50* (2013.01); *F02D 41/006* (2013.01); *F02D 41/029* (2013.01); *F02D 41/221* (2013.01); *F02M 26/01* (2016.02); *F02M 26/47* (2016.02); *F02D 41/042* (2013.01); *F02D 2041/001* (2013.01); *F02D 2200/0802* (2013.01); *F02D 2200/50* (2013.01); *F02D 2250/24* (2013.01)

(58) Field of Classification Search
CPC ........ F02M 26/01; F02M 26/45; F02M 26/47; F02M 26/49; F02D 41/006; F02D 41/0062
See application file for complete search history.

(56) References Cited

U.S. PATENT DOCUMENTS

| 7,778,766 B1 * | 8/2010 | Cowgill .................. F01L 1/344 123/568.14 |
| 2003/0221679 A1 | 12/2003 | Surnilla |
| 2007/0144502 A1 * | 6/2007 | Ogawa ................ F02D 13/0265 123/568.14 |
| 2008/0281497 A1 * | 11/2008 | Kumano ................... F02D 9/02 701/102 |
| 2014/0379206 A1 | 12/2014 | Martin |
| 2016/0332617 A1 * | 11/2016 | Miller ................... B60W 20/15 |

* cited by examiner

*Primary Examiner* — Sizo B Vilakazi
*Assistant Examiner* — Anthony L Bacon
(74) *Attorney, Agent, or Firm* — Geoffrey Brumbaugh; McCoy Russell LLP (57) ABSTRACT

Systems and methods for diagnosing operation of an internal exhaust gas recirculation system of an internal combustion engine are presented. The system and method may be applied to conventional or hybrid powertrains having a capability to rotate an engine via an electric machine. The internal exhaust gas recirculation system may be diagnosed based on output of a differential pressure sensor.

20 Claims, 6 Drawing Sheets

METHODS AND SYSTEMS FOR DIAGNOSING ENGINE INTERNAL EXHAUST GAS RECIRCULATION

FIELD

The present description relates to a system and method for diagnosing internal exhaust gas recirculation (IEGR) of an internal combustion engine. The methods and systems may be useful for engines that control IEGR via adjustable intake and exhaust valve timing.

BACKGROUND AND SUMMARY

Internal combustion engines may produce NOx as a byproduct of combustion of air and fuel. NOx is a regulated vehicle exhaust emission, and as such, it may be desirable to ascertain whether or not an engine is producing an expected amount of NOx. Larger amounts of NOx may be produced at higher engine speeds and loads where exhaust gases combust and produce higher temperatures and pressures. NOx formation in engine cylinders may be reduced via reducing pressure and temperature within a cylinder. NOx may be reduced via reducing pressure in a cylinder, but reducing cylinder pressure may also reduce engine output. However, temperature in a cylinder may be reduced without engine power loss at low and medium engine loads via combining exhaust gases with fresh charge (e.g., air and fuel) in the cylinder. Exhaust gases from a previous combustion event may be retained and/or drawn into a cylinder via simultaneously opening intake and exhaust valves, which may be referred to as positive intake and exhaust valve overlap. Exhaust gas recirculation occurring within a cylinder via valve timing may be referred to as IEGR. Nevertheless, if intake valve and exhaust valve overlap is too long or too short, engine misfire or elevated NOx levels may result. Therefore, it may be desirable to determine whether or not a desired amount of IEGR is provided.

The inventor herein has recognized the above-mentioned disadvantages of too much or too little IEGR and has developed a method, comprising: rotating an engine that is not combusting an air-fuel mixture and providing a difference between a sensor output when an EGR system is commanded to a baseline position and the sensor output when the EGR system is commanded to a non-baseline position in response to a request to diagnose the EGR system; and adjusting output of the engine when the engine is combusting air and fuel responsive to the difference.

By rotating an engine unfueled and sensing flow through the engine, it may be possible to provide the technical result of diagnosing operation of an IEGR system without increasing engine NOx output. In particular, an IEGR system may adjust intake and exhaust valve timing such that at base positions, engine air flow though the unfueled engine is greater than when intake and exhaust valve timing is adjusted to provide increased IEGR, if the IEGR system is operating as is desired. However, if the IEGR system is not operating as is desired, air flow through the unfueled engine having intake and exhaust valve timing adjusted to provide increased IEGR may be greater than is desired. The higher air flow rate through the engine may be indicative of IEGR system degradation.

The present description may provide several advantages. Specifically, the approach may diagnose operation of an IEGR system without increasing engine NOx output. Further, the approach may perform IEGR diagnostics using sensors other than sensors that may typically be used to diagnose an IEGR system so that independent verification of the IEGR system may be provided. Further still, the approach may vehicle be performed without degrading vehicle drivability when the IEGR system is diagnosed.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
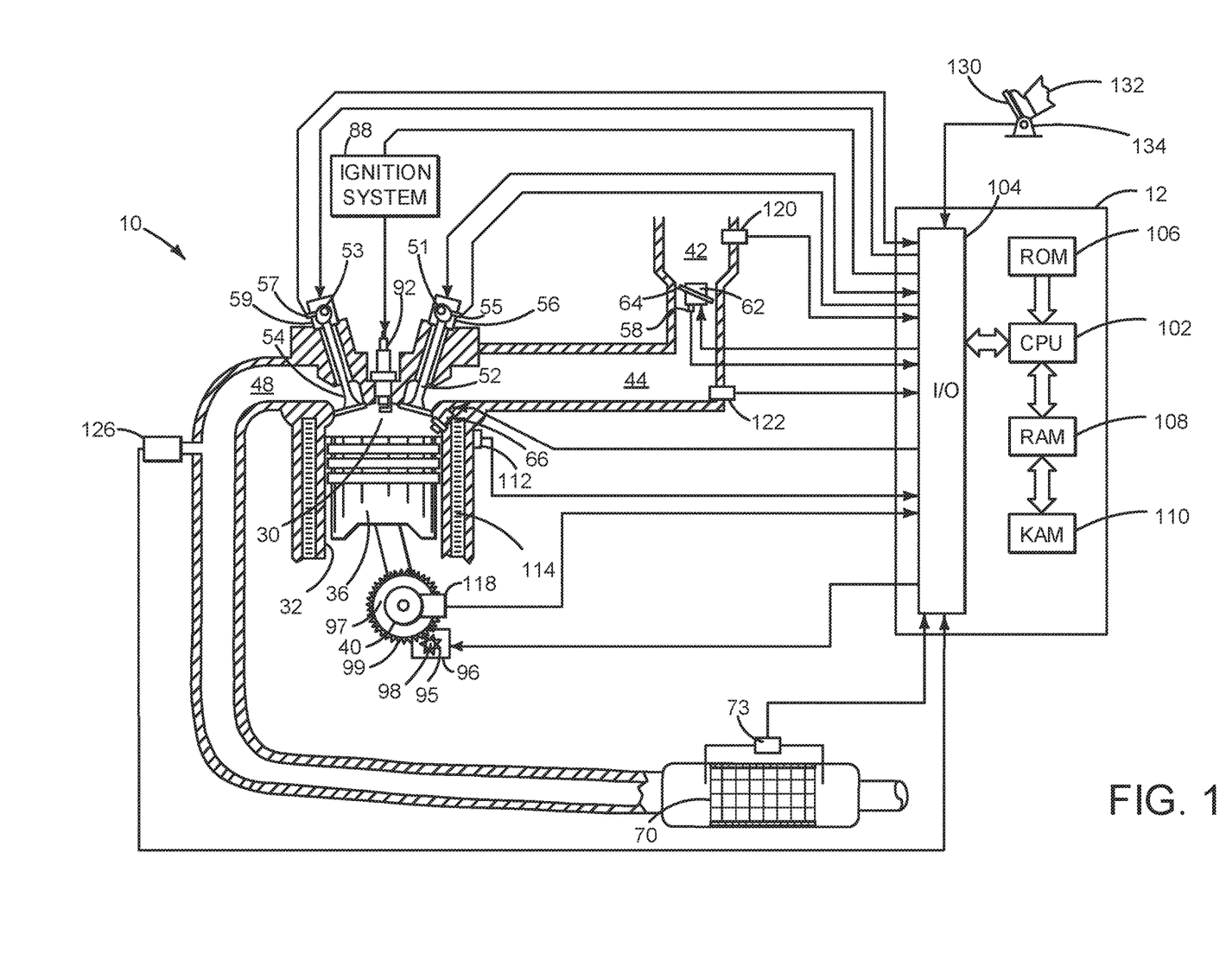
FIG. 1 is a schematic diagram of an engine.
Figure 2:
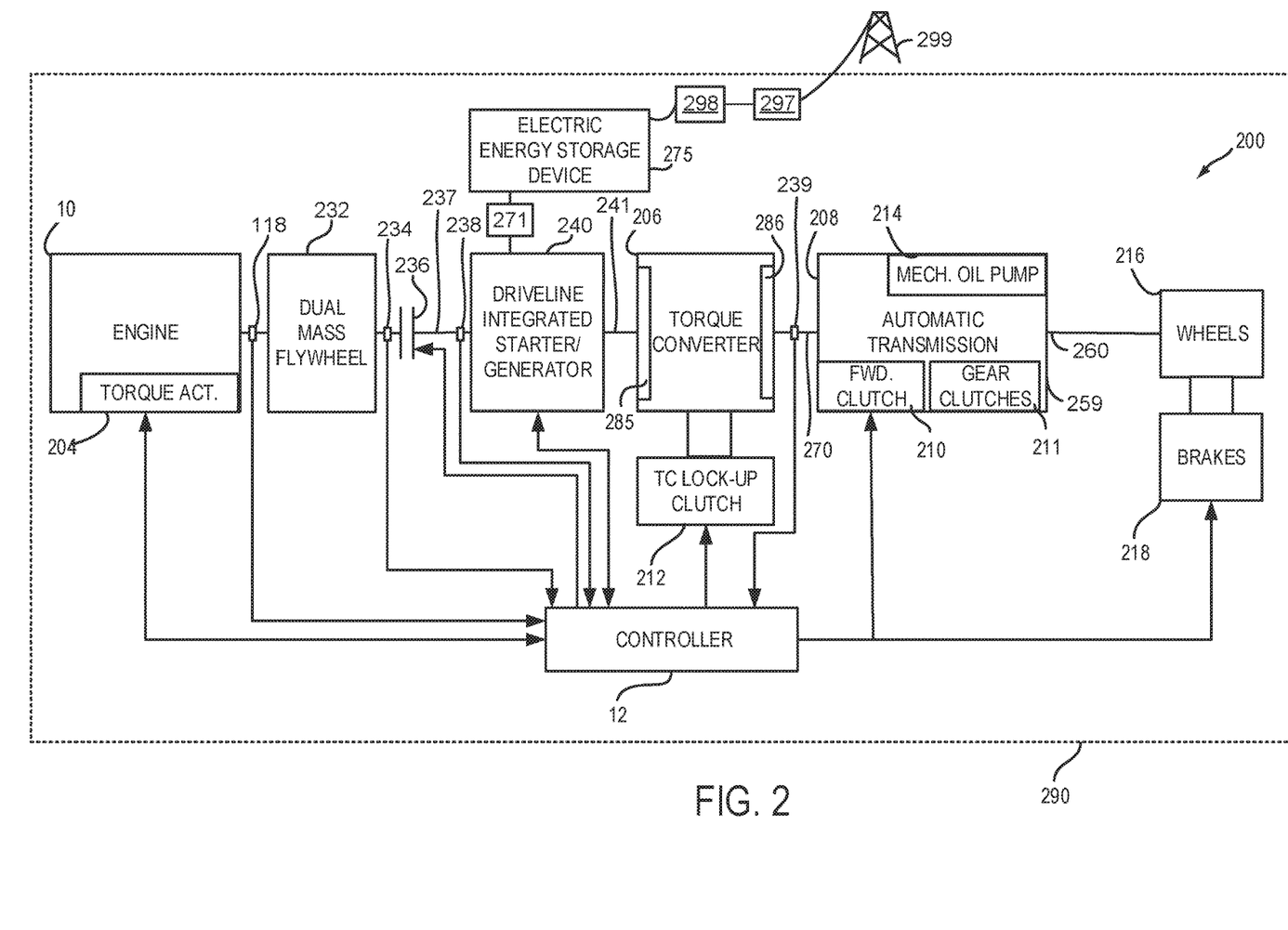
FIG. 2 shows a first example vehicle driveline configuration.
Figure 3:
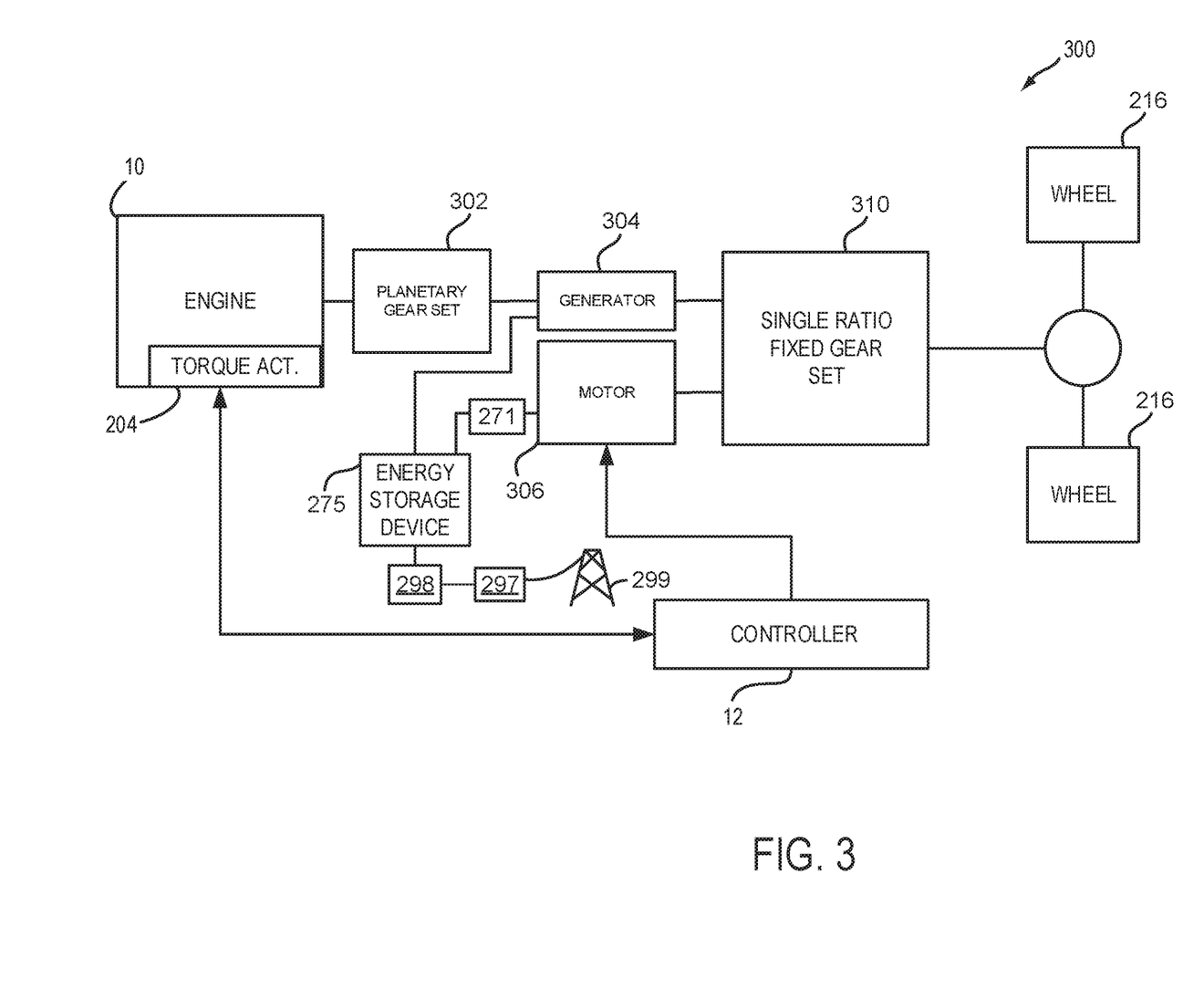
FIG. 3 shows a second example vehicle driveline configuration.
Figure 4:
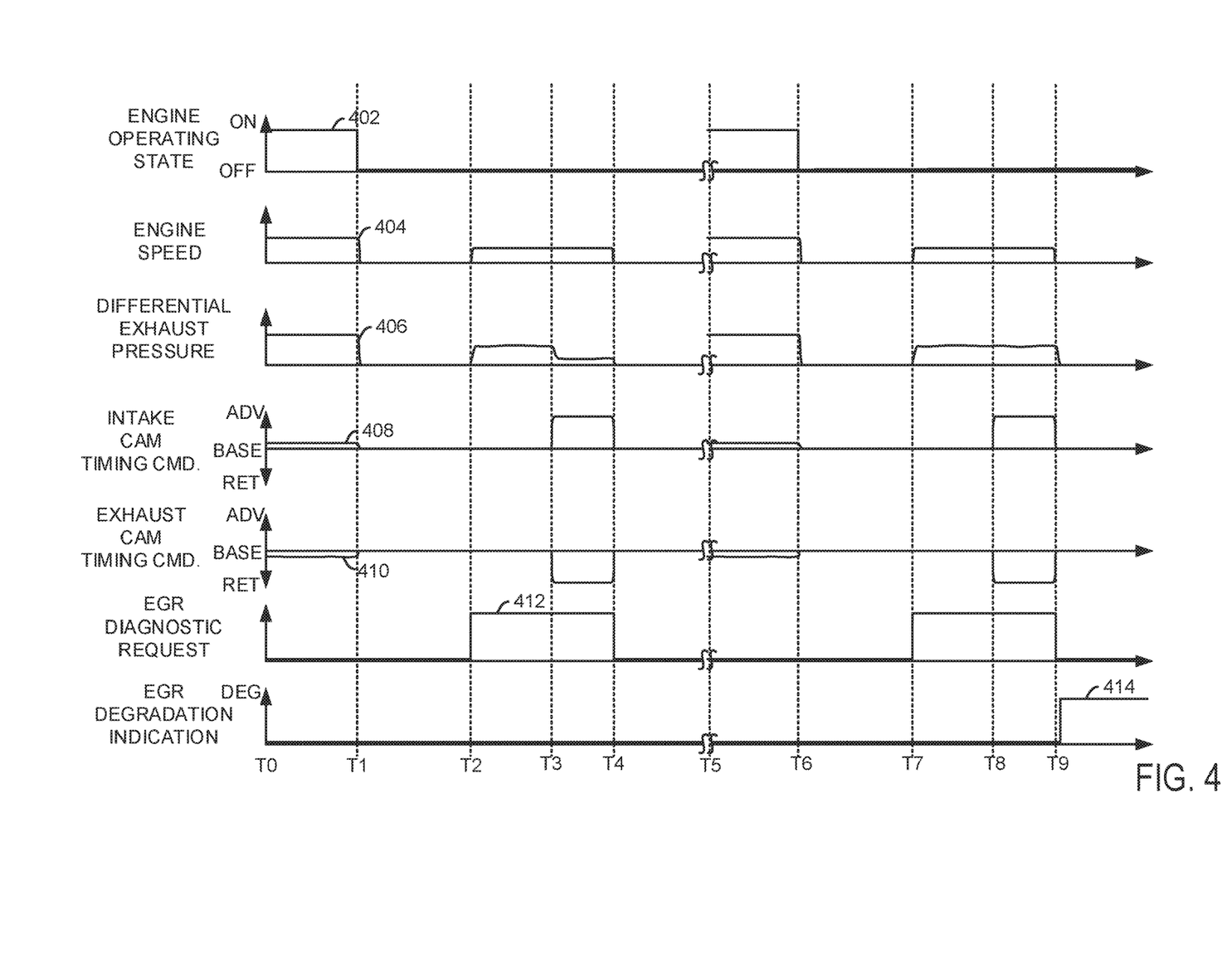
FIG. 4 shows an example IEGR diagnostic sequence.
Figure 5:
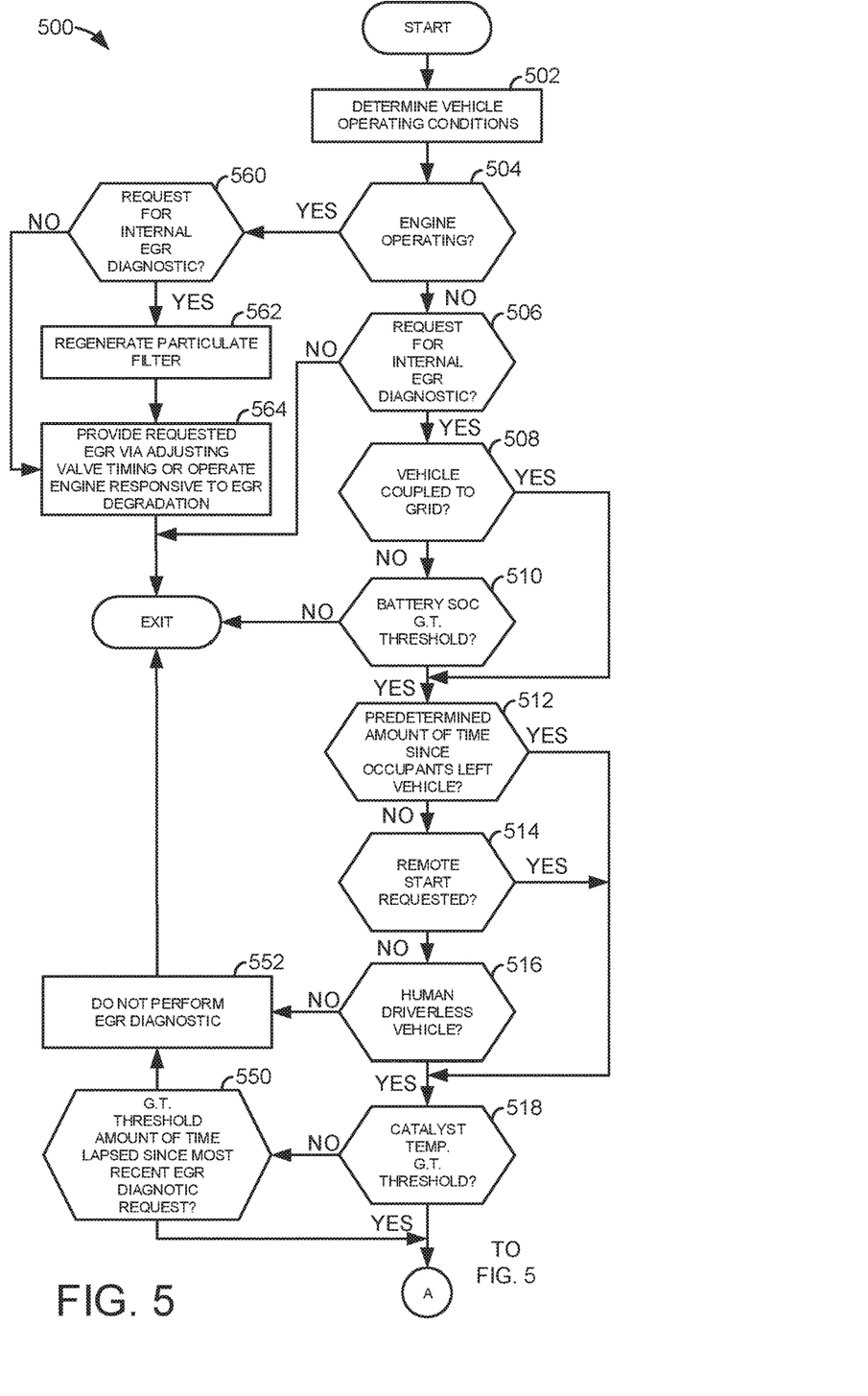
FIGS. 5 and 6 show an example method for diagnosing an IEGR system.
Figure 6:
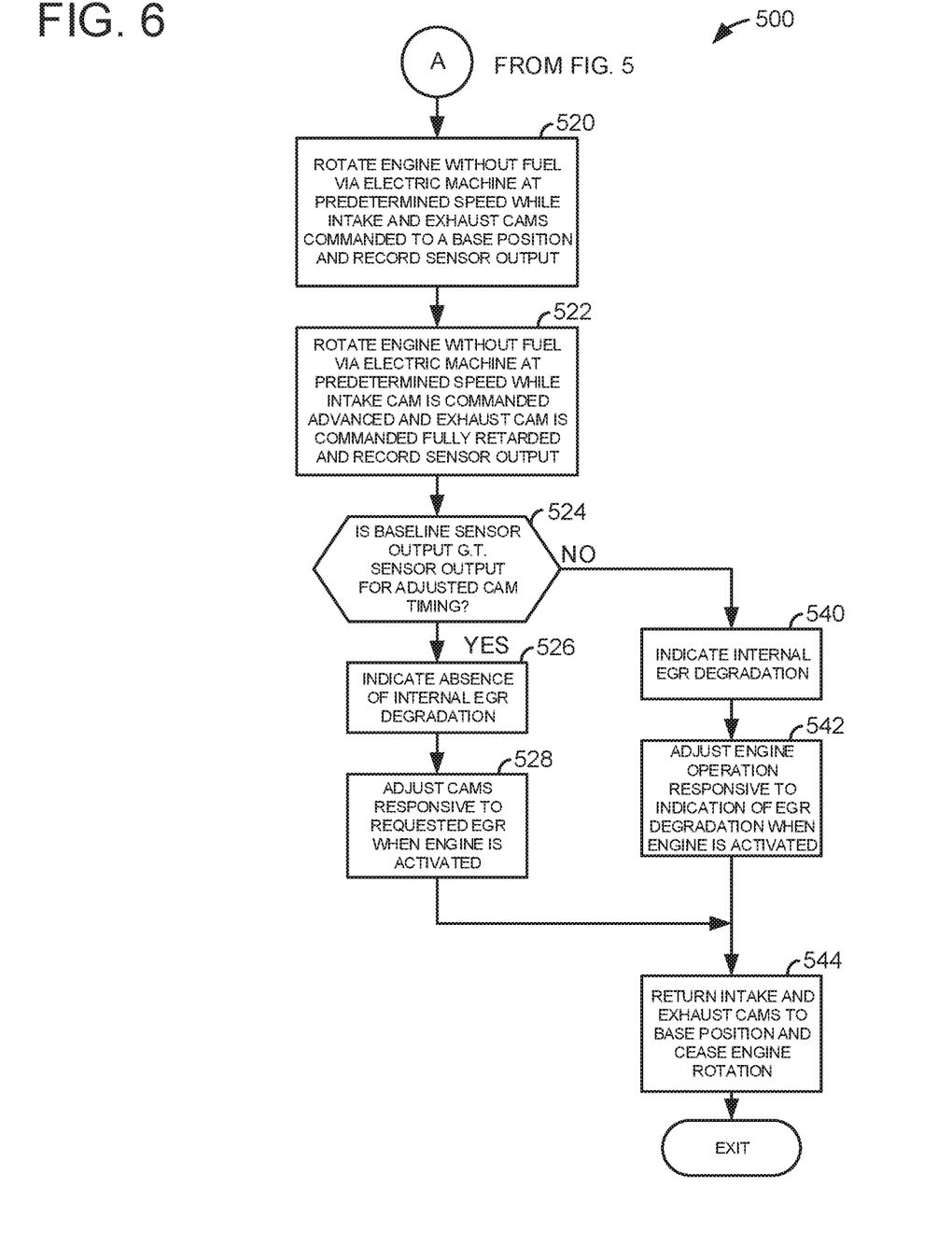

The present description is related to diagnosing an IEGR system. The IEGR system may control IEGR via adjusting intake valve and exhaust valve overlap. The IEGR system may be diagnosed independently of sensors used to operate the IEGR system. The IEGR system may be included in an engine as shown in FIG. 1. The engine may be selectively coupled to a motor/generator to provide input to a transmission as is shown in FIG. 2. Alternatively, the engine of FIG. 1 may be included in a power split hybrid driveline with a motor and a generator as is shown in FIG. 3. A prophetic example showing an IEGR diagnostic sequence is illustrated in FIG. 4. A method for diagnosing an IEGR system is shown in FIGS. 5 and 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to engine crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40 via rotary actuators 56 and 59. An internal EGR control system, which may be a sub-system of the system shown in FIG. 1, may include rotary actuators 56 and 59, controller 12, intake valve 52, and exhaust valve 54.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of particulate filter 70. Alternatively, a two-state exhaust gas oxygen sensor may be substituted for UEGO sensor 126. Differential pressure sensor 73 provides an indication of a pressure difference across particulate filter 70. A pressure differential may increase as a flow rate of gases (e.g., exhaust gas or air) through particulate filter 70 increases.

Particulate filter 70 can include multiple catalyst bricks, including bricks that convert less desirable gases into more desirable gases. In another example, multiple emission control devices, each with multiple bricks, can be used. Particulate filter 70 can include a three-way type catalyst in one example.

Controller 12 is shown in FIG. 1 as a conventional microcomputer including: microprocessor unit 102, input/output ports 104, read-only memory (non-transient) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIGS. 2-3. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via driveline integrated starter/generator (DISG) 240. Further, engine 10 may generate or adjust torque via torque actuator 204, such as a fuel injector, throttle, camshaft, valve lift, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. Voltage controller 271 may boost voltage of energy storage device 275 to operate DISG 240. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor, and the electrical energy storage device 275 may be selectively coupled to a stationary electrical power grid 299 via receptacle 297 and voltage converter 298 to recharge the electrical energy storage device 275. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-N where N is an integer number between 4-25) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

Referring now to FIG. 3, an example of an alternative driveline 300 is shown. Driveline 300 includes engine 10 and torque actuator 204 as described in FIGS. 1 and 2. Engine 10 provides torque to planetary gear set 302 and generator 304 operates in a speed control mode to control engine torque delivery to single ratio gearing system 310. Output from generator 304 provides electrical energy to energy storage device 275 and electric machine (e.g., motor/generator) 306. Electrical energy storage device 275 may supply electrical power to motor 306 via variable voltage controller 271 when engine 10 is not operating. Electrical energy storage device may be a battery, capacitor, or other electrical energy storage device, and electrical energy storage device 275 may be selectively coupled to a stationary electrical power grid 299 via receptacle 297 and voltage converter 298 to recharge the electrical energy storage device 275. Electric machine 306 may be operated as a motor or a generator. Charge may be provided when electric machine 306 is operated in a generator mode during regenerative braking. Alternatively, electric machine 306 may provide torque to wheels 216 and rotate engine 10 for starting or diagnostics. Torque from engine 10 and motor 306 may be combined in single ratio gearing system 10 to provide torque to vehicle wheels 216 via a mechanical power path. Controller 12 controls operation of engine 10, generator 304, and motor 306 to adjust power supplied to vehicle wheels 216. Thus, the driveline of FIG. 3 does not include a transmission with multiple fixed gear ratios for delivering engine and motor power to vehicle wheels.

Thus, the system of FIGS. 1-3 provides for a vehicle system, comprising: an engine; an electric machine in mechanical communication with the engine; and a controller including non-transitory instructions executable to rotate the engine via the electric machine without supplying fuel to the engine in response to a request to diagnose an exhaust gas recirculation system. The vehicle system includes where the exhaust gas recirculation system includes an intake cam and an exhaust cam. The vehicle system further comprises additional instructions to combust air and fuel in the engine and regenerate a particulate filter in response to the request to diagnose the exhaust gas recirculation system. The vehicle system further comprises additional instructions to rotate the engine via the electric machine without supplying fuel to the engine in further response to a vehicle being coupled to a stationary electrical grid. The vehicle system further comprises additional instructions to rotate the engine via the electric machine without supplying fuel to the engine in further response to a temperature of a catalyst being greater than a threshold temperature. The vehicle system further comprises additional instructions to rotate the engine in response to a driver removing a vehicle key or leaving a predetermined proximity of a vehicle in which the engine operates.

Referring now to FIG. 4, a prophetic IEGR diagnostic sequence is shown. The sequence of FIG. 4 may be provided via the system shown in FIGS. 1-3 in cooperation with the method of FIGS. 5 and 6. The vertical lines T0-T7 represent times of interest in the sequence and the double SS marks indicate a break in time during the sequence. The break in time may be long or short in duration.

The first plot from the top of FIG. 4 is a plot of engine operating state versus time. The vertical axis represents engine state and the horizontal axis represents time. The engine is on (e.g., rotating and combusting air and fuel) when trace 402 is at a higher level near the tip of the vertical axis arrow. The engine is off (e.g., not combusting air and fuel) when trace 402 is near the horizontal axis. Time increases from the left side of the plot to the right side of the plot.

The second plot from the top of FIG. 4 is a plot of engine speed versus time. The vertical axis represents engine speed and engine speed increases in the direction of the vertical axis arrow. The horizontal axis represents time and time increases from the left side of the figure to the right side of the figure.

The third plot from the top of FIG. 4 is a plot of differential pressure across a particulate filter (e.g., 70 of FIG. 1) versus time. The vertical axis represents differential pressure and differential pressure increases in the direction of the vertical axis arrow. The horizontal axis represents time and time increases from the left side of the figure to the right side of the figure.

The fourth plot from the top of FIG. 4 is a plot of intake cam timing command (CMD) versus time. The vertical axis represents intake cam timing command and the intake cam timing is commanded advanced when trace 408 is above the horizontal axis. The intake cam timing is commanded retarded when trace 408 is below the horizontal axis. The intake cam timing is commanded to a baseline when trace 408 is not visible. The horizontal axis represents time and time increases from the left side of the figure to the right side of the figure.

The fifth plot from the top of FIG. 4 is a plot of exhaust cam timing command (CMD) versus time. The vertical axis represents exhaust cam timing command and the exhaust cam timing is commanded advanced when trace 410 is above the horizontal axis. The exhaust cam timing is commanded retarded when trace 410 is below the horizontal axis. The exhaust cam timing is commanded to a baseline when trace 408 is not visible. The horizontal axis represents time and time increases from the left side of the figure to the right side of the figure.

The sixth plot from the top of FIG. 4 is a plot of EGR diagnostic request state versus time. The vertical axis represents EGR diagnostic request state and the horizontal axis represents time. The EGR diagnostic state is asserted to request an EGR diagnostic when trace 412 is at a higher level near the tip of the vertical axis arrow. The EGR diagnostic is not being requested when trace 412 is near the horizontal axis. Time increases from the left side of the plot to the right side of the plot.

The seventh plot from the top of FIG. 4 is a plot of EGR degradation indication state versus time. The vertical axis represents EGR degradation indication state and the horizontal axis represents time. The EGR degradation indication is asserted when trace 414 is at a higher level near the tip of the vertical axis arrow. The EGR degradation indication is not asserted when trace 414 is near the horizontal axis. Time increases from the left side of the plot to the right side of the plot.

At time T0, the engine is combusting air and fuel as indicated by the engine operating state. The engine speed is at a middle level and the differential exhaust pressure is at a middle level indicating a higher flow level through the particulate filter. The intake cam is advanced a small amount and the exhaust cam is advanced a small amount. An EGR diagnostic is not being requested and EGR degradation is not indicated.

At time T1, the engine is shut off and engine speed goes to zero. The differential exhaust pressure also goes to zero and the intake and exhaust cams are returned to their respective base positions. The EGR diagnostic is not requested and EGR degradation is not indicated. The vehicle's human operator also leaves the proximity of the vehicle (not shown).

At time T2, an EGR diagnostic is requested a predetermined amount of time (e.g., two minutes) after the vehicle operator leaves the proximity of the vehicle. The engine is accelerated to a predetermined speed (e.g., 500 RPM) via an electric machine and the intake and exhaust cams are held in baseline positions to provide a baseline air flow rate through the engine representative of a baseline IEGR amount. The engine is not fueled while it is rotating and the differential exhaust pressure begins to increase. EGR degradation is not indicated.

Between time T2 and time T3, the differential pressure stabilizes to a substantially constant level and it is recorded to controller memory. Engine speed is maintained constant and intake and exhaust valve timing is maintained. The EGR diagnostic request remains asserted and EGR degradation is not indicated. The engine remains not combusting air and fuel.

At time T3, the intake cam timing is fully advanced and the exhaust valve cam timing is fully retarded in response to increase IEGR. The engine remains rotating at a same speed unfueled and the differential exhaust pressure begins to decline in response to the changes in cam timing. The EGR diagnostic request remains asserted and EGR degradation is not asserted.

Between time T3 and time T4, the differential pressure stabilizes to a substantially constant lower level reflecting the additional requested EGR amount and the differential pressure is recorded to controller memory. Engine speed is maintained constant and intake and exhaust valve timing is maintained. The EGR diagnostic request remains asserted and EGR degradation is not indicated. The engine remains not combusting air and fuel. Near time T4, the differential exhaust pressure observed between time T1 and time T2 is compared to the differential exhaust pressure observed between time T3 and time T4. In one example, the differential exhaust pressure observed between time T3 and time T4 is subtracted from the differential exhaust pressure observed between time T2 and time T3. If the difference is greater than a threshold as it is in this example, IEGR degradation is not indicated. The threshold may be an empirically determined threshold that allows for variation from engine to engine. Further, the threshold may be based on intake and exhaust valve timing that provides a change of greater than five percent EGR flow from baseline valve timings. For example, if baseline EGR valve timing provides for 5% EGR at 500 RPM, then the threshold value corresponds to a 10% EGR level and fully advanced intake valve timing and fully retarded exhaust valve timing may correspond to 15% EGR level. Thus, if the intake and exhaust cam timing provides for a differential exhaust pressure that corresponds to less than 10% EGR when the engine is rotated with the intake cam fully advanced and the exhaust cam fully retarded, IEGR degradation may be indicted by the comparison of differential pressure to the threshold differential pressure.

At time T4, the EGR diagnostic request is withdrawn and EGR degradation is not indicated. The intake cam timing and exhaust valve timings are returned to baseline timings and engine speed returns to zero. The engine state remains off and exhaust differential pressure is reduced to zero. At time T5, a break in the operating sequence occurs.

After the time break at time T5, the engine is combusting air and fuel as indicated by the engine operating state. The engine speed is at a middle level and the differential exhaust pressure is at a middle level indicating a higher flow level through the particulate filter. The intake cam is advanced a small amount and the exhaust cam is advanced a small amount. An EGR diagnostic is not being requested and EGR degradation is not indicated.

At time T6, the engine is shut off and engine speed goes to zero. The differential exhaust pressure also goes to zero and the intake and exhaust cams are returned to their respective base positions. The EGR diagnostic is not requested and EGR degradation is not indicated. The vehicle's human operator also leaves the proximity of the vehicle (not shown).

At time T7, an EGR diagnostic is requested a predetermined amount of time (e.g., two minutes) after the vehicle operator leaves the proximity of the vehicle. The engine is accelerated to a predetermined speed (e.g., 500 RPM) via an electric machine and the intake and exhaust cams are held in baseline positions to provide a baseline air flow rate through the engine representative of a baseline IEGR amount. The engine is not fueled while it is rotating and the differential exhaust pressure begins to increase. EGR degradation is not indicated.

Between time T7 and time T8, the differential pressure stabilizes to a substantially constant level and it is recorded to controller memory. Engine speed is maintained constant and intake and exhaust valve timing is maintained. The EGR diagnostic request remains asserted and EGR degradation is not indicated. The engine remains not combusting air and fuel.

At time T8, the intake cam timing is fully advanced and the exhaust valve cam timing is fully retarded in response to increase IEGR. The engine remains rotating at a same speed unfueled and the differential exhaust pressure begins to decline in response to the changes in cam timing. The EGR diagnostic request remains asserted and EGR degradation is not asserted.

Between time T8 and time T9, the differential pressure remains at substantially the same level as it was between time T7 and time T8. The differential pressure has not changed and it indicates the additionally commanded EGR is not being delivered since air flow through the engine is not reduced (higher EGR percentages provide lower flow through the engine because a portion of exhaust or air in the exhaust manifold is drawn back into the cylinder as the intake stroke commences since intake valve opening time is advanced and exhaust valve timing is retarded to provide the additional amount of EGR requested. The differential pressure is recorded to controller memory. Engine speed is maintained constant and intake and exhaust valve timing is maintained. The EGR diagnostic request remains asserted and EGR degradation is not indicated. The engine remains not combusting air and fuel. Near time T9, the differential exhaust pressure observed between time T7 and time T8 is compared to the differential exhaust pressure observed between time T8 and time T9. Since the differential pressure has not changed the difference is zero and it does not exceed the threshold level.

At time T9, the EGR diagnostic request is withdrawn and EGR degradation is indicated since the differential pressure difference was less than the threshold level. The intake cam timing and exhaust valve timings are returned to baseline timings and engine speed returns to zero. The engine state remains off and exhaust differential pressure is reduced to zero. The next time the engine is started, engine operation is adjusted responsive to the indication of IEGR degradation.

Referring now to FIGS. 5 and 6, an example method for diagnosing and responding to a diagnosis of IEGR degradation is shown. The method of FIGS. 5 and 6 may be included in the systems of FIGS. 1-3 as instructions stored in non-transitory memory. Further, the method of FIGS. 5 and 6 may operate in cooperation and in conjunction with the system of FIGS. 1-3 to receive input from sensors and provide output to actuators.

At 502, method 500 determines vehicle operating conditions. Vehicle operating conditions may include, but are not limited to battery state of charge (SOC), requests for IEGR diagnostics, IEGR degradation indication state, time since a human driver last left the proximity of the vehicle that includes method 500, remote vehicle starting requests, catalyst and/or particulate filter temperature, differential pressure across a particle filter, engine speed, vehicle speed, intake manifold pressure, engine air flow, engine spark timing. Method 500 proceeds to 504 after determining operating conditions.

At 504, method 500 judges whether or not the engine of the vehicle is combusting air and fuel. In one example, method 500 judges if the engine is combusting air and fuel if fuel injectors are activated and spark is being delivered to engine cylinders. If method 500 judges that the engine is combusting air and fuel, the answer is yes and method 500 proceeds to 560. Otherwise, the answer is no and method 500 proceeds to 506.

At 560, method 500 judges if a request for an IEGR diagnostic is being requested. An IEGR diagnostic may be requested after a vehicle has driven a predetermined distance, unexpected levels of engine NOx are detected, or cam sensors detect unexpected cam positions. A request for IEGR diagnostic may be indicated and stored as a value in memory and the value may indicate the presence or absence of an IEGR request. If method 500 judges that an IEGR request is present, the answer is yes and method 500 proceeds to 562. Otherwise, the answer is no and method 500 proceeds to 564.

At 562, method 500 initiates and performs regeneration of a particulate filter unless the particulate filter has been recently regenerated. In one example, method 500 regenerates the particulate filter via increasing exhaust gas temperature. Exhaust gas temperature may be increases via retarding engine spark timing and increasing air flow into the engine when the engine is combusting air and fuel. In diesel engines, fuel injecting timing may be retarded and the engine may be throttle to increase exhaust gas temperatures to promote combustion within the particulate filter, thereby reducing soot in the particulate filter and regenerating the particulate filter. By regenerating the particulate filter, output of the differential pressure sensor may be more predictable and provide a better estimate of air flow through the engine. Method 500 proceeds to 564 after the particulate filter is regenerated.

At 564, method 500 provides a requested EGR amount and adjusts engine torque output responsive to a driver demand torque and engine speed if EGR degradation is not present. For example, if 5% EGR flow to engine cylinders is requested, intake and exhaust cams are adjusted to positions responsive to engine speed and load that provide 5% EGR flow into engine cylinders. Further, engine torque may be adjusted via adjusting a throttle opening amount and/or fuel injection timing. However, if EGR degradation is present, method 500 may retard spark timing and/or limit an opening amount of a throttle to control engine NOx production. Thus, engine performance may be reduced until the EGR degradation condition is resolved. Method 500 proceeds to exit.

At 506, method 500 judges whether or not there is a request for an IEGR diagnostic. If method judges that there is a request for an IEGR diagnostic, the answer is yes and method 500 proceeds to 508. Otherwise, the answer is no and method 500 proceeds to exit.

At 508, method 500 judges whether or not the vehicle is coupled to a stationary electrical power grid. In one example, method 500 may judge that the vehicle is coupled to an electric power grid in response to a voltage detected at a power receptacle of the vehicle exceeding a threshold voltage (e.g., 60 volts). If method 500 judges that the vehicle is coupled to a stationary electric power grid, the answer is yes and method 500 proceeds to 512. Otherwise, the answer is no and method 500 proceeds to 510.

At 510, method 500 method 500 judges whether or not a battery state of charge (SOC) is greater than a threshold charge. In one non-limiting example, the battery threshold state of charge may be 30% of full charge. If method 500 judges that battery SOC is greater than the threshold, the answer is yes and method 500 proceeds to 512. Otherwise, the answer is no and method 500 proceeds to exit. Thus, if IEGR diagnostic are required but battery SOC is low and the vehicle is not coupled to a stationary power grid, method 500 does not perform the IEGR diagnostic so that vehicle electrical functions, such as engine starting, may be preserved for a later time.

At 512, method 500 judges if a predetermined amount of time has expired since occupants of the vehicle have left the proximity of the vehicle most recently. The predetermined amount of time may vary in response to present ambient environmental conditions and the present location the vehicle is parked. For example, if the outside temperature is less than a threshold (e.g., 20° C.) temperature, the threshold amount of time may be 2 minutes. However, if the outside temperature is greater than the threshold temperature, the threshold amount of time may be 4 minutes. Method 500 may start a timer in response to vehicle keys being removed from a vehicle, a key fob exiting a transmitting or receiving range of the vehicle, or other conditions indicative of occupant location. If the timer exceeds the threshold amount of time, the answer is yes and method 500 proceeds to 518. Otherwise, the answer is no and method 500 proceeds to 514.

At 514, method 500 judges whether or not a remote vehicle start is requested. A remote vehicle start request may be a basis for starting the engine and/or providing electrical power to electrical propulsion sources. Method 500 may receive a request to remotely start the vehicle via a radio frequency or other similar means. If method 500 judges that a remote vehicle start is requested, the answer is yes and method 500 proceeds to 518. Otherwise, the answer is no and method 500 proceeds to 516.

At 516, method 500 judges whether or not the vehicle is a human driverless vehicle or an autonomous vehicle. Method 500 may enquire to one or more locations in memory to determine the vehicle's configuration. If method 500 judges that the vehicle is a human driverless vehicle, the answer is yes and method 500 proceeds to 518. Otherwise, the answer is no and method 500 proceeds to 552.

At 518, method 500 judges if a temperature of a catalyst is greater than a threshold temperature. In one example, the threshold temperature is a catalyst light off temperature (e.g., a temperature above which the catalyst reaches 50% efficiency). Method 500 may measure or estimate the catalyst temperature. If method 500 judges that catalyst temperature is greater than (G.T.) a threshold temperature, the answer is yes and method 500 proceeds to 520. Otherwise, the answer is no and method 500 proceeds to 550.

At 550, method 500 judges whether or not a threshold amount of time has elapsed since a most recent diagnostic IEGR request has been made (e.g., 48 hours). If method 500 judges that a threshold amount of time has elapsed since a most recent IEGR diagnostic request has been made without the IEGR diagnostic being performed, the answer is yes and method 500 proceeds to 520. Otherwise, the answer is no and method 500 proceeds to 552.

At 552, method 500 delays performing the IEGR diagnostic, but the IEGR diagnostic request remains asserted. Method 500 proceeds to exit.

At 520, method 500 rotates the engine without fuel at a substantially constant speed (e.g., 500 RPM±30 RPM) via an electric machine (e.g., a starter motor, ISG 240, or electric machine 306) while the vehicle is stationary. The engine may be rotated with transmission clutches open or via a planetary gear set. The engine's intake and exhaust cams are commanded to base positions where a baseline EGR amount may be provided when the engine is combusting air and fuel. The baseline EGR amount may be a low amount of EGR. Output of one or more sensors is recorded to memory while the engine rotates at the substantially constant speed. In one example, the output of the sensor recorded is a differential pressure sensor configured to monitor a pressure difference across a particulate filter. The differential pressure sensor may provide a low noise measurement at rather low engine air flow rates as compared to a mass air flow (MAF) sensor and it may be used to determine engine air flow without approximating engine volumetric efficiency as may be needed with a manifold absolute pressure (MAP) sensor. Alternatively, output of a MAF or MAP may be recorded to controller memory. Method 500 waits a predetermined amount of time before recording sensor output to memory to allow engine speed and sensor output to stabilize. Method 500 proceeds to 522.

At 522, method 500 continues to rotate the engine without fuel at the substantially constant speed via the electric machine while the vehicle is stationary. However, the engine's intake cam is commanded fully advanced and the exhaust cam is commanded fully retarded to provide cam timings for elevated levels of EGR (e.g., greater than baseline EGR amounts) when the engine is combusting air and fuel. Output of the same one or more sensors is recorded to memory while the engine rotates at the substantially constant speed. Method 500 waits a predetermined amount of time after adjusting the engine's cams before recording sensor output to memory to allow engine speed and sensor output to stabilize. Method 500 proceeds to 524.

At 524, method 500 judges if sensor output for baseline cam timings (sensor output determined at 520) is greater than sensor output for adjusted cam timings (sensor output determined at 522) by a threshold amount. The threshold amount may be based off known sensor output for cam timing that provide an EGR amount that is between the EGR amount for baseline cam positions and the EGR amount for fully advance intake cam and fully retarded exhaust cam. If method 524 judges that sensor output for baseline cam timings is greater than sensor output for adjusting cam timing by more than a threshold amount, the answer is yes and method 500 proceeds to 526. Otherwise, the answer is no and method 500 proceeds to 540.

In some examples, method 500 may generate a difference between baseline sensor output and adjusted sensor output to determine if baseline sensor output is greater than adjusted sensor output by more than a threshold amount. Consequently, if the difference is greater than the threshold amount, the answer is yes.

At 526, method 500 indicates no IEGR degradation. The lack of IEGR degradation may be indicated by a value of a variable in memory (e.g., a memory location is written with a value of zero). Method 500 proceeds to 528.

At 528, method 500 continues to allow adjustment of cam timings according to a mapped desired EGR amounts responsive to engine speed and load when the engine is activated. Method 500 proceeds to 544.

At 544, method 500 returns intake and exhaust cams to their baseline positions and ceases engine rotation.

At 540, method 500 indicates IEGR degradation. IEGR degradation may be indicated by a writing a value of a variable in memory (e.g., a memory location is written with a value of one). An operator indicator light or display panel may indicate IEGR degradation responsive to the value of the variable. Method 500 proceeds to 542.

At 542, method 500 modifies engine operation for the next time the engine is activated. In one example, the intake and exhaust cams are commanded to their respective baseline positions and held in place. Further, engine spark timing maybe retarded to reduce engine NOx and the engine throttle opening amount may be limited to notify vehicle occupants service may be desirable. Method 500 proceeds to exit. The next time the engine is operated and reaches 560, these modifications may be activated.

Thus, the method of FIGS. 5 and 6 provides for a method, comprising: rotating an engine that is not combusting an air-fuel mixture and providing a difference between a sensor output when an EGR system is commanded to a baseline position and the sensor output when the EGR system is commanded to a non-baseline position in response to a request to diagnose the EGR system; and adjusting output of the engine when the engine is combusting air and fuel responsive to the difference. The method includes where the engine is rotated via an electric machine that propels a vehicle. The method further comprises rotating the engine in further response to a predetermined amount of time since occupants have most recently exited a vehicle.

In some examples, the method further comprises rotating the engine in further response to a vehicle that includes the engine being a human driverless vehicle. The method further comprises rotating the engine in further response to a request to remotely start a vehicle that includes the engine. The method further comprises rotating the engine in further response to a battery state of charge being greater than a threshold. The method further comprises rotating the engine in further response to a temperature of a catalyst being greater than a threshold. These conditions may ensure desired vehicle operation after the IEGR diagnostic is requested. The method includes where the sensor is a differential pressure sensor configured to sense pressure across a particulate filter. The method includes where the EGR system includes an intake cam and an exhaust cam.

The method of FIGS. 5 and 6 also provides for a method, comprising: rotating an engine of a vehicle that is not combusting an air-fuel mixture and recording a differential pressure sensor output value while an EGR system is commanded to provide a baseline EGR amount in response to a request to diagnose the EGR system and the vehicle being coupled to a stationary electrical power grid; rotating the engine that is not combusting an air-fuel mixture and recording the differential pressure sensor output value while the EGR system is commanded to provide a non-baseline EGR amount in response to the request to diagnose the EGR system and the vehicle being coupled to the stationary electrical power grid; and adjusting engine spark timing responsive to a difference between the baseline sensor output and the non-baseline sensor output. The method includes where the engine is rotated at a constant speed. The method further comprises regenerating a particulate filter in response to the request to diagnose the EGR system. The method includes where the particulate filter is regenerated when the engine is combusting air and fuel at a time before the engine is rotated while not combusting the air-fuel mixture and recording a differential pressure sensor output value. The method includes where the particulate filter is regenerated via increasing exhaust temperature via retarding spark timing.

As will be appreciated by one of ordinary skill in the art, the methods described herein may represent one or more of any number of processing strategies such as event-driven, interrupt-driven, multi-tasking, multi-threading, and the like. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method, comprising:
rotating an engine that is not combusting an air-fuel mixture and generating a difference between a sensor output with an internal exhaust gas recirculation (IEGR) system commanded to a baseline position and the sensor output with the IEGR system commanded to a non-baseline position in response to a request to diagnose the IEGR system, the sensor not used to operate the IEGR system; and
adjusting output of the engine when the engine is combusting air and fuel responsive to the difference.

2. The method of claim 1, where the engine is rotated via an electric machine that propels a vehicle.

3. The method of claim 1, further comprising rotating the engine in further response to a predetermined amount of time since occupants have most recently exited a vehicle.

4. The method of claim 1, further comprising rotating the engine in further response to a vehicle that includes the engine being a human driverless vehicle.

5. The method of claim 1, further comprising rotating the engine in further response to a request to remotely start a vehicle that includes the engine.

6. The method of claim 1, further comprising rotating the engine in further response to a battery state of charge being greater than a threshold.

7. The method of claim 1, further comprising rotating the engine in further response to a temperature of a catalyst being greater than a threshold.

8. The method of claim 1, where a sensor is a differential pressure sensor configured to sense pressure across a particulate filter.

9. The method of claim 1, where the IEGR system includes an intake cam and an exhaust cam.

10. A method, comprising:
rotating an engine of a vehicle that is not combusting an air-fuel mixture and recording a differential pressure sensor output value while an internal exhaust gas recirculation (IEGR) system is commanded to provide a baseline EGR amount in response to a request to diagnose the IEGR system and the vehicle being coupled to a stationary electrical power grid;
rotating the engine that is not combusting the air-fuel mixture and recording the differential pressure sensor output value while the IEGR system is commanded to generate a non-baseline EGR amount in response to the request to diagnose the IEGR system and the vehicle being coupled to the stationary electrical power grid; and
adjusting engine spark timing responsive to a difference between the baseline EGR amount and the non-baseline EGR amount.

11. The method of claim 10, where the engine is rotated at a constant speed.

12. The method of claim 10, further comprising regenerating a particulate filter in response to the request to diagnose the IEGR system.

13. The method of claim 12, where the particulate filter is regenerated when the engine is combusting air and fuel at a time before the engine is rotated while not combusting the air-fuel mixture and recording the differential pressure sensor output value.

14. The method of claim 13, where the particulate filter is regenerated via increasing exhaust temperature via retarding spark timing.

15. A vehicle system, comprising:
an engine;
an electric machine in mechanical communication with the engine; and
a controller including non-transitory instructions executable to rotate the engine via the electric machine without supplying fuel to the engine in response to a request to diagnose an internal exhaust gas recirculation system, and indicating degradation of the internal exhaust gas recirculation system based on sensed operating parameters from sensors independent of those sensors used to operate the internal exhaust gas recirculation system.

16. The vehicle system of claim 15, where the internal exhaust gas recirculation system includes an intake cam and an exhaust cam.

17. The vehicle system of claim 15, further comprising additional instructions to combust air and fuel in the engine and regenerate a particulate filter in response to the request to diagnose the internal exhaust gas recirculation system.

18. The vehicle system of claim 15, further comprising additional instructions to rotate the engine via the electric machine without supplying fuel to the engine in further response to a vehicle being coupled to a stationary electrical grid.

19. The vehicle system of claim 15, further comprising additional instructions to rotate the engine via the electric machine without supplying fuel to the engine in further response to a temperature of a catalyst being greater than a threshold temperature.

20. The vehicle system of claim 15, further comprising additional instructions to rotate the engine in response to a driver removing a vehicle key or leaving a predetermined proximity of a vehicle in which the engine operates.

* * * * *